US006411061B1

United States Patent
Disser et al.

(10) Patent No.: US 6,411,061 B1
(45) Date of Patent: *Jun. 25, 2002

(54) HIGH PERFORMANCE BRUSH MOTOR DRIVER IN CONJUCTION WITH LOW COST SR MOTOR DRIVER

(75) Inventors: Robert John Disser, Dayton; Patrick Allen Mescher, Bellbrook, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/735,417

(22) Filed: Dec. 12, 2000

Related U.S. Application Data

(60) Provisional application No. 60/170,558, filed on Dec. 14, 1999.

(51) Int. Cl.[7] .................................................. H02P 5/28
(52) U.S. Cl. ........................ 318/701; 318/254; 307/24
(58) Field of Search .................................. 318/701, 254, 318/439, 138, 685, 696; 307/24, 34, 38

(56) References Cited

U.S. PATENT DOCUMENTS

| | | |
|---|---|---|
| 4,615,419 A | 10/1986 | Gaiser |
| 4,716,994 A | 1/1988 | Iwamoto |
| 4,835,408 A * | 5/1989 | Ray et al. ..................... 307/24 |
| 5,279,394 A | 1/1994 | Wollenweber et al. |
| 5,477,943 A | 12/1995 | Enomoto et al. |
| 5,900,712 A | 5/1999 | Disser et al. |

* cited by examiner

*Primary Examiner*—Khanh Dang
(74) *Attorney, Agent, or Firm*—Scott A. McBain

(57) ABSTRACT

A combined drive circuit for a split brake system of a motor vehicle has a switched reluctance motor and a brush motor. The switched reluctance motor has multiple phase windings. The combined drive circuit includes a DC power source with first and second supply buses. A SR motor driver supplies current to the switched reluctance motor. The SR motor driver has a first capacitor coupled to the phase windings for storing energy from the phase windings and a second capacitor coupled to the first capacitor and a third supply bus, thereby developing a third supply bus voltage across the second capacitor. A brush motor driver is coupled to the first and second capacitor. The SR motor driver is adapted to supply current to the brush motor. The brush motor driver includes first, second, third and fourth switching elements coupled to the brush motor.

24 Claims, 3 Drawing Sheets

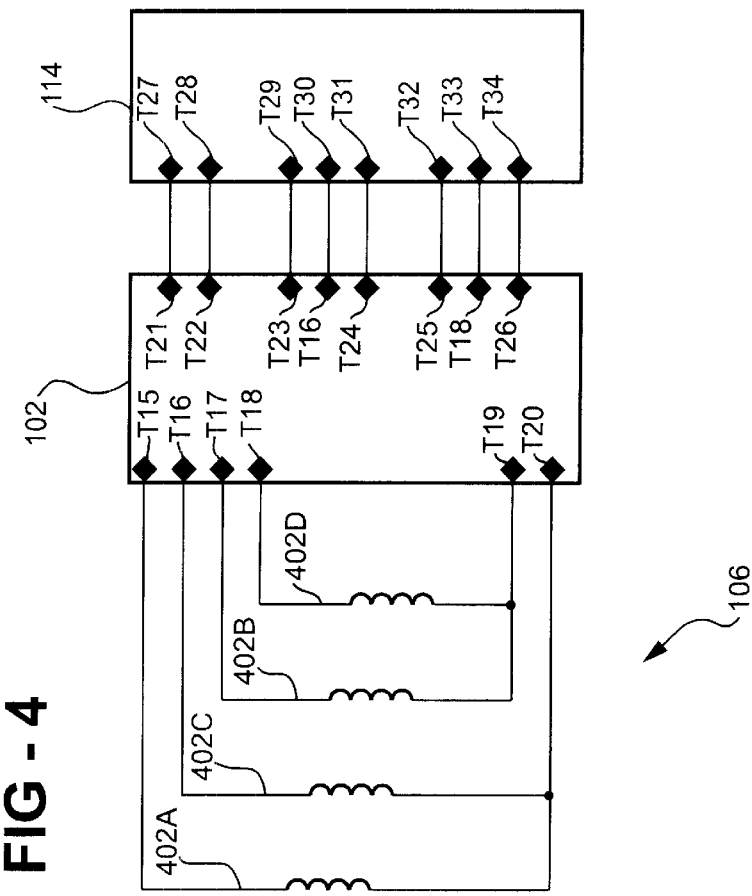
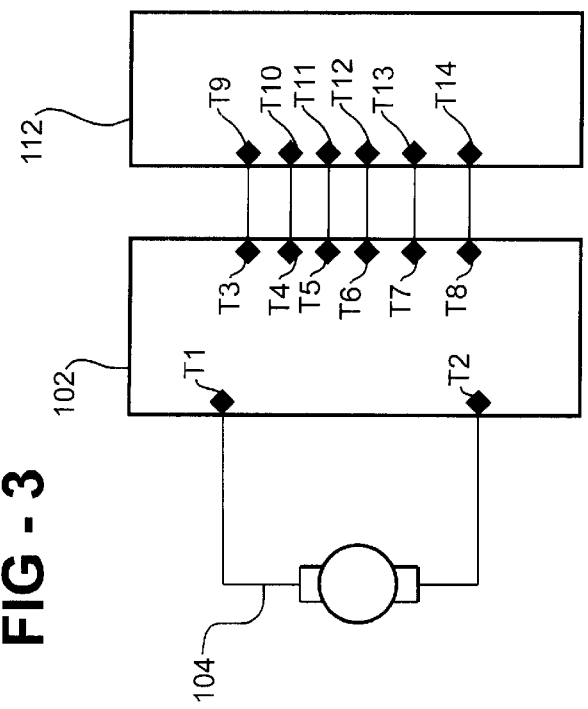
FIG - 4
FIG - 3

HIGH PERFORMANCE BRUSH MOTOR DRIVER IN CONJUCTION WITH LOW COST SR MOTOR DRIVER

CROSS-REFERENCE TO RELATED APPLICATIONS

This application claims the benefit of U.S. Provisional Patent Application Serial No. 60/170,558, filed Dec. 14, 1999.

BACKGROUND OF THE INVENTION

1. Field of the Invention

The present invention relates generally to electric motors and, more particularly, to a combined driver circuit for a brush motor and a switched reluctance motor.

2. Background of the Invention

Electric motors are used in a variety of applications. Two types of electric motors are brush motors and switched reluctance motors. Each has different operating characteristics and therefore, advantages suitable for different applications.

For example, a split brake system for a motor vehicle typically controls a front and diagonally opposed rear brake. The front brake requires high response performance and the rear brake requires significantly reduced response performance. Thus, a brush motor is used to actuate the rear brake and a switched reluctance motor is used to actuate the front brake.

With regard to the switched reluctance motor, the drive circuit is comprised of power switching devices and diodes for sequentially energizing the motor phase windings in accordance with the position of the rotor to produce a rotating magnetic field that interacts with the rotor poles to produce torque of a desired direction and magnitude.

A number of drive circuit topologies have been proposed to minimize the number of power devices in an effort to reduce the cost of the driver circuit. One such topology is described in U.S. Pat. No. 4,835,408 issued to Ray et al. The circuit disclosed in Ray, commonly referred to as a split-link circuit, utilizes capacitors to establish an intermediate voltage bus. One or more of the phase windings are coupled to the intermediate voltage bus. In automobile applications, the supply voltage is typically 12 volts. Such a design reduces the number of power devices required, but only one half of the supply voltage is available for energizing the phase windings. As a result, the efficiency of the drive is reduced due to increased switching and conduction losses.

U.S. Pat. No. 5,900,712 issued to Disser et al, maintains a second bus at a voltage which is either higher or lower than the supply voltage, thereby extending the voltage range of the supply.

With regard to the brush motor, motor direction is controlled by the polarity of the voltage applied to the brush terminals. Since it is desirable to maximize power to the brake, it is desirable to apply full supply voltage to the brush terminals.

The present invention is aimed at one or more of the problems above.

BRIEF SUMMARY OF THE INVENTION

In one aspect of the present invention, a combined drive circuit for a switched reluctance motor and a brush motor is provided. The switched reluctance motor has multiple phase windings. The combined drive circuit includes a DC power source with first and second supply buses. A SR motor driver supplies current to the switched reluctance motor. The SR motor driver has a first capacitor coupled to the first and second supply buses for storing energy from the DC power source and a second capacitor coupled to the first capacitor and a third supply bus, thereby developing a third supply bus voltage across the second capacitor. A brush motor driver is coupled to the first and second capacitor. The SR motor driver is adapted to supply current to the brush motor. The brush motor driver has first, second, third and fourth switching elements coupled to the brush motor.

In another aspect of the present invention, a combined drive circuit for a split brake system of a motor vehicle is provided. The split brake system has a switched reluctance motor and a brush motor. The switched reluctance motor has multiple phase windings. The combined drive circuit includes a DC power source with first and second supply buses. A SR motor driver supplies current to the switched reluctance motor. The SR motor driver has a first capacitor coupled to the first and second supply buses for storing energy from the DC power source and a second capacitor coupled to the first capacitor and a third supply bus, thereby developing a third supply bus voltage across the second capacitor. A brush motor driver is coupled to the first and second capacitor. The SR motor driver is adapted to supply current to the brush motor. The brush motor driver has first, second, third and fourth switching elements coupled to the brush motor.

BRIEF DESCRIPTION OF THE SEVERAL VIEWS OF THE DRAWINGS

FIG. 3 is a block diagram illustrating connections between the combined drive circuit and the brush motor of FIG. 1; and, FIG. 4 is a block diagram illustrating connections between the combined drive circuit and the switched reluctance motor of FIG. 1.

DETAILED DESCRIPTION OF THE INVENTION

Figure 1:
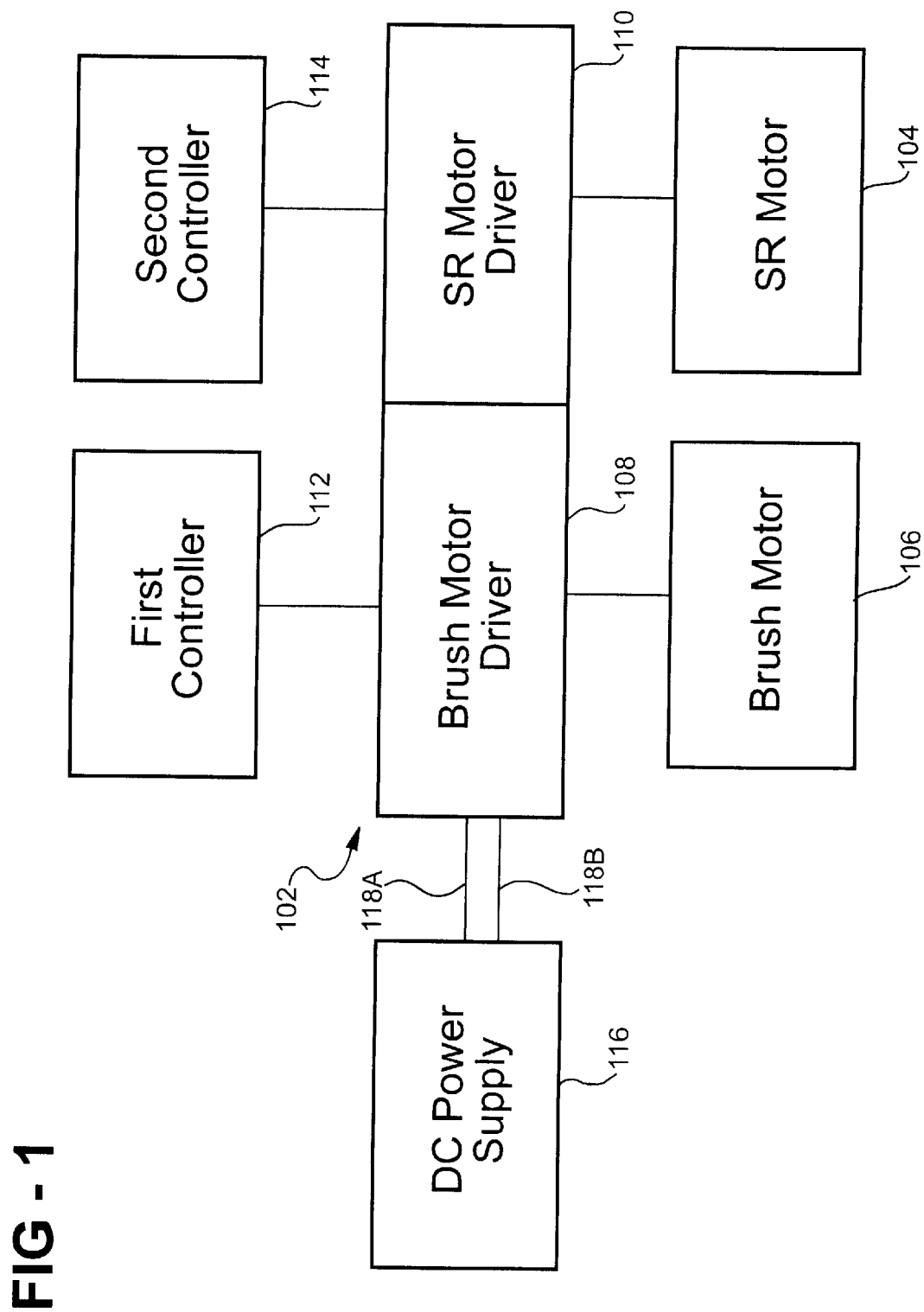
FIG. 1 is a block diagram of a combined drive circuit for a brush motor and a switched reluctance motor.
Figure 2:
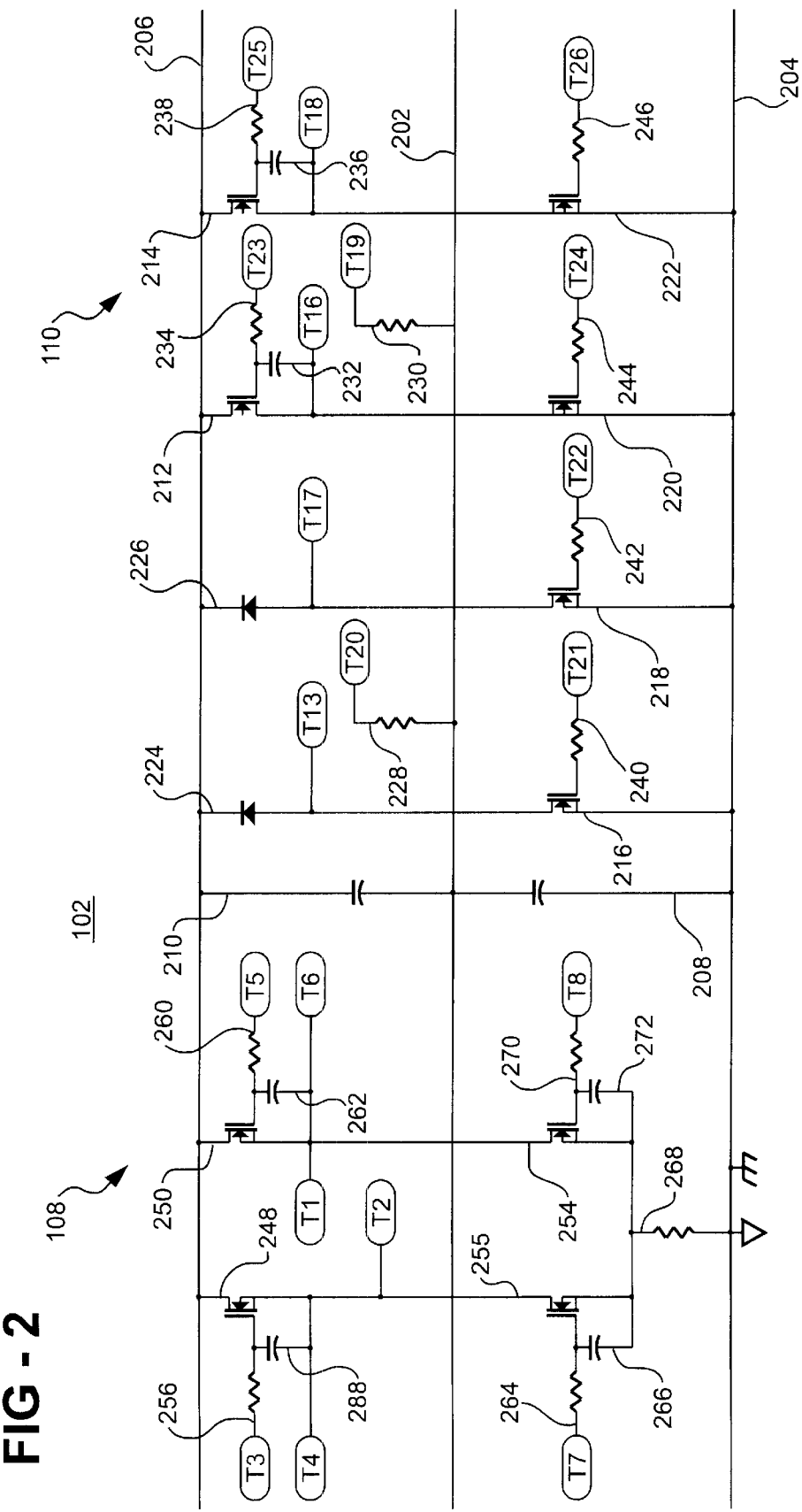
FIG. 2 is a schematic of the combined drive circuit of FIG. 1, according to an embodiment of the present invention.

With reference to FIGS. 1 and 2, the present invention provides a combined drive circuit 102 for a switched reluctance (SR) motor 104 and a brush motor 106. The switched reluctance motor 104 includes multiple phase windings (see below). A DC power source 116 supplies power to the combined drive circuit 102. The combined drive circuit 102 includes a brush motor driver 108 and a switched reluctance (SR) motor driver 110. First and second controllers 112, 114 apply control signals to the brush and SR drivers 108, 110 to control the current supplied to the respective motor 106, 104. In the preferred embodiment, the control signals are pulse width modulated (PWM) signals. The generation of such PWM signals and the control of brush motors and SR motors are well known in the art, and thus, is not further discussed.

A DC power supply 116 supplies power to the brush motor 106 and the SR motor 104 through the respective driver 108, 110. The DC power supply 116, which may be a battery, such as a conventional automotive storage battery, or a source of rectified AC, is connected to the combined driver circuit 102 at first and second supply terminals 118A, 118B.

With reference to FIG. 2, the first supply terminal 118A defines a first supply bus 202 and the second supply terminal 118B defines a second supply bus 204. The combined driver circuit 102 includes a third supply bus 206, as described below.

With reference to FIGS. 3 and 4, the combined driver circuit 102 includes first and second terminals, T1, T2. The brush motor 104 is coupled to the combined driver circuit 102 at the first and second terminals, T1, T2. The combined driver circuit 102 also includes third, fourth, fifth, sixth, seventh and eighth terminals, T3, T4, T5, T6, T7, T8. The first controller 112 includes ninth, tenth, eleventh, twelfth, thirteenth, and fourteenth terminals T9, T10, T11, T12, T13, T14. The combined driver circuit 102 is coupled to the first controller 112 via the third through fourteenth terminals, T3, T4, T5, T6, T7, T8, T9, T0, T11, T12, T13, T14, as shown.

The combined driver circuit 102 also includes fifteenth, sixteenth, seventeenth, eighteenth, nineteenth, and twentieth terminals, T15, T16, T17, T18, T19, T20. The SR motor 104 preferably includes first, second, third, and fourth phase windings 402A, 402C, 402B, 402D. The first phase winding 402A is connected at a first end of the fifteenth terminal T15 and at a second end to the twentieth terminal T20. The second phase winding 402B is connected at a first end to the seventeenth terminal T17 and at a second end to the nineteenth terminal T19. The third phase winding 402C is connected at a first end to the sixteenth terminal T16 and at a second end to the twentieth terminal T20. The fourth phase winding 402D is connected at a first end to the eighteenth terminal T18 and at a second end to the nineteenth terminal T19.

The combined circuit driver 102 also includes twenty-first, twenty-second, twenty-third, twenty-fourth, twenty-fifth, and twenty-sixth terminals, T21, T22, T23, T24, T25, T26. The second controller 114 includes twenty-seventh, twenty-eighth, twenty-ninth, thirtieth, thirty-first, thirty-second, thirty-third and thirty-fourth terminals, T27, T28, T29, T30, T31, T32, T33, T34. The combined driver circuit 102 is coupled to the second controller 114 via the twenty-first through thirty-fourth terminals, T21, T22, T23, T24, T25, T26, T27, T28, T29, T30, T31, T32, T33, T34, and the sixteenth and eighteenth terminals T16, T18, as shown.

Returning to FIG. 2, the SR motor driver 110 includes a first capacitor 208 and a second capacitor 210. The second capacitor 210 is coupled to the first capacitor 208 and the third supply bus 206. The second capacitor 210 is also coupled to the phase windings 402A, 402B, 402C, 402D, developing a third supply bus (B++ or times the battery voltage of B+). The SR motor driver 110 includes first, second, third, fourth, fifth and sixth power transistors 212, 214, 216, 218, 220, 222 and first and second free-wheeling diodes 224, 226.

The first and second power transistors and the first and second free-wheeling diodes 224, 226, 212, 214, direct inductive currents stored in the respective phase windings 402A, 402B, 402C, 402D to one of the capacitors 208, 210, or to another of the phase windings 402A, 402B, 402C, 402D being energized.

The twentieth terminal T20 is coupled to the first supply bus 202 by a first resistor 228. The nineteenth terminal T19 is coupled to the first supply bus 202 by a second resistor 230. The sixteenth and twenty-third terminals T16, T23 are coupled to the first power transistor 212 by a third capacitor 232 and a third resistor 234, respectively. The eighteenth and twenty-fifth terminals T18, T25 are coupled to the second power transistor 214 by a fourth capacitor 236 and a fourth resistor 238, respectively.

The twenty-first terminal T21 is coupled to the third power transistor 216 by a fifth resistor 240. The twenty-second terminal T22 is coupled to the fourth power transistor 218 by a sixth resistor 242. The twenty-fourth terminal T24 is coupled to the fourth power transistor 220 by a seventh resistor 244. The twenty-sixth terminal T26 is coupled to the sixthpower transistor 222 by a eighth resistor 246.

The second controller 114 generates a pulse-width modulated (PWM) signal in order to control the SR motor 104 via the SR motor driver 110. Such a system is disclosed in U.S. Pat. No. 5,900,712 issued May 4, 1999 to Robert J. Disser, et al (Disser), which is hereby incorporated by reference. While the SR motor driver 110 described above generates a supply voltage above the DC power supply voltage 116, the driver 110 could be adapted to generate a supply voltage having a negative magnitude of B−. Such a circuit is also described in Disser. Other embodiment of the SR motor driver 110 are disclosed in Disser, all of which fall under the scope of the present invention.

The brush motor driver 108 is coupled to the SR motor driver 110. By providing a third supply bus 206, the brush motor 106 can be driven by the increased voltage resulting in improved free speed and thus, better response rate.

The brush motor driver 108 is coupled to the first and second capacitor 208, 210 of the SR motor driver 110. The brush motor driver 110 is adapted to supply current to the brush motor 106. The brush motor driver 110 includes first, second, third and fourth switching elements or power FET transistors 248, 250, 252, 254 coupled to the brush motor 106. Preferably, the first, second, third, and fourth switching elements are connected in an "H" configuration as shown. The first switching element 248 is coupled to the third terminal T3 by a ninth resistor 256 and to the fourth terminal T4 by a fifth capacitor 258. The second switching element 250 is coupled to the fifth terminal T5 by a tenth resistor 260 and to the sixth terminal T6 by a sixth capacitor 262. The third switching element 252 is coupled to the seventh terminal T7 by an eleventh resistor 264 and to the second supply bus 204 by a seventh capacitor 266 and a twelfth resistor 268. The fourth switching element 254 is coupled to the eighth terminal T8 by a thirteenth resistor 270 and to the second supply bus 204 by an eighth capacitor 272 and the twelfth resistor 268.

The first controller 112 uses conventional PWM control techniques to control both motor current and motor voltage to achieve desired motor performance.

The brush motor 106 operates between ground (the second supply bus 204) and the third power supply voltage, B++. The increased voltage improves the free speed and thus the response rate of the brush motor 104.

With this invention has been described in reference to the illustrated embodiment, it will be understood that various modifications and design variations will occur to those skilled in the art, and that drive circuits and controls incorporating such modifications may fall within the scope of this invention, which is defined by the appended claims.

What is claimed is:

1. A combined drive circuit for a switched reluctance motor and a brush motor, the switched reluctance motor having multiple phase windings, comprising:

a DC power source having a first terminal defining a first supply bus and a second terminal defining a second supply bus, each of the phase windings having a first end connected to the first supply bus and a second end;

a third supply bus;

a SR motor driver for supplying current to the switched reluctance motor, the SR motor driver having a first capacitor coupled to the phase windings for storing energy from the phase windings and a second capacitor coupled to the first capacitor and the third supply bus, thereby developing a third supply bus voltage across the second capacitor; and, a brush motor driver being coupled to the first and second capacitor, the SR motor driver being adapted to supply current to the SR brush, the brush motor driver having first, second, third and fourth switching elements coupled to the brush motor.

2. The combined drive circuit, as set forth in claim 1, wherein the first, second, third, and fourth switching elements are arranged in a H-bridge configuration.

3. The combined drive circuit, as set forth in claim 1, wherein the third supply bus voltage is positive.

4. The combined drive circuit, as set forth in claim 1, wherein the third supply bus voltage is negative.

5. The combined drive circuit, as set forth in claim 1, including first and second diodes coupled to the first and second capacitors.

6. The combined drive circuit, as set forth in claim 5, wherein the first and second diodes are adapted to direct inductive currents stored in a respective phase windings to one of the first and second capacitors and another of the phase windings.

7. The combined drive circuit, as set forth in claim 1, including first and second power transistors and first and second diodes being coupled to the first and second capacitors.

8. The combined drive circuit, as set forth in claim 7, wherein the first and second power transistors and the first and second diodes are adapted to direct inductive currents stored in respective phase windings to one of the first and second capacitors and another of the phase windings.

9. The combined drive circuit, as set forth in claim 8, includes third and fourth power transistors, wherein the third and fourth power transistors and the first and second diodes are adapted to direct inductive currents stored in respective phase windings to one of the first and second capacitors and another of the phase windings.

10. The combined drive circuit, as set forth in claim 1, including a first controller for supplying a pulse width modulated signal to the brush motor driver for controlling motor voltage and motor current to achieve desired motor performance.

11. The combined drive circuit, as set forth in claim 10, wherein the first controller is adapted to control the brush motor bi-directionally in first and second directions.

12. The combined drive circuit, as set forth in claim 9, wherein the brush motor has higher load in a first direction and wherein the brush motor is driven by the DC power supply in the first direction.

13. A combined drive circuit for a split brake system of a motor vehicle, having a switched reluctance motor and a brush motor, the switched reluctance motor having multiple phase windings, comprising:

a DC power source having a first terminal defining a first supply bus and a second terminal defining a supply bus, each of the phase windings having a first end connected to the first supply bus and a second end;

a third supply bus;

a SR motor driver for supplying current to the switched reluctance motor, the SR motor driver having a first capacitor coupled to the phase windings for storing energy from the phase windings and a second capacitor coupled to the first capacitor and the third supply bus, thereby developing a third supply bus voltage across the second capacitor; and, a brush motor driver being coupled to the first and second capacitor, the SR motor driver being adapted to supply current to the brush motor, the brush motor driver having first, second, third, and fourth switching elements coupled to the brush motor.

14. The combined drive circuit, as set forth in claim 13, wherein the first, second, third, and fourth switching elements are arranged in a H-bridge configuration.

15. The combined drive circuit, as set forth in claim 13, wherein the third supply bus voltage is positive.

16. The combined drive circuit, as set forth in claim 13, wherein the third supply bus voltage is negative.

17. The combined drive circuit, as set forth in claim 13, including first and second diodes coupled to the first and second capacitors.

18. The combined drive circuit, as set forth in claim 17, wherein the first and second diodes are adapted to direct inductive currents stored in a respective phase windings to one of the first and second capacitors and another of the phase windings.

19. The combined drive circuit, as set forth in claim 13, including first and second power transistors and first and second diodes being coupled to the first and second capacitors.

20. The combined drive circuit, as set forth in claim 19, wherein the first and second power transistors and the first and second diodes and are adapted to direct inductive currents stored in a respective phase windings to one of the first and second capacitors and another of the phase windings.

21. The combined drive circuit, as set forth in claim 20, includes third and fourth power transistors, wherein the third and fourth power transistors and the first and second diodes are adapted to direct inductive currents stored in respective phase windings to one of the first and second capacitors and another of the phase windings.

22. The combined drive circuit, as set forth in claim 13, including a first controller for supplying a pulse width modulated signal to the brush motor drive for controlling motor voltage and motor current to achieve desired motor performance.

23. The combined drive circuit, as set forth in claim 22, wherein the first controller is adapted to control the brush motor bi-directionally in first and second directions.

24. The combined drive circuit, as set forth in claim 23, wherein the brush motor has higher load in a first direction and wherein the brush motor is driven by the DC power supply in the first direction.

* * * * *